United States Patent [19]

Slocum

[11] Patent Number: 5,533,814
[45] Date of Patent: Jul. 9, 1996

[54] LOW PROFILE SELF-COMPENSATED HYDROSTATIC THRUST BEARING

[75] Inventor: Alexander H. Slocum, Concord, N.H.

[73] Assignee: AESOP, Inc., Concord, N.H.

[21] Appl. No.: 237,853

[22] Filed: May 4, 1994

[51] Int. Cl.⁶ .................................................. F16C 32/06
[52] U.S. Cl. .......................................... 384/123; 384/112
[58] Field of Search .............................. 384/12, 121, 111, 384/112, 123

[56] References Cited

U.S. PATENT DOCUMENTS

| | | | |
|---|---|---|---|
| 4,493,610 | 1/1985 | Iino | 384/111 |
| 4,915,510 | 4/1990 | Arvidsson | 384/121 |
| 5,042,616 | 8/1991 | McHugh | 384/121 |

*Primary Examiner*—Lenard A. Footland
*Attorney, Agent, or Firm*—Rines and Rines

[57] ABSTRACT

A novel means for the design of a spindle having a shaft provided with a hydrostatic bearing end surface for resisting axial thrust force upon the end surface, the hydrostatic bearing being a self-compensating bearing mounted circumferentially about the shaft near the end surface and having a fluid pressure supply groove providing fluid for the self-compensating bearing, the bearing being mounted upon an axially extending member one end of which serves as part of the end surface of the shaft and the other end of which serves as a reverse thrust surface, along with means for flowing fluid from the pressure supply groove radially across said reverse thrust end surface and through an opening extending axially between the reverse thrust end surface, and the end surface of the shaft, opposing the thrust force with pressure proportional to the axial position of the shaft and related to the degree of fluid compensation in the bearing.

9 Claims, 4 Drawing Sheets

Fig. 7

| | | | |
|---|---|---|---|
| Supply pressure: Ps (Pa, atm, psi) | 5,071,500 | 50 | 735 |
| Viscosity, mu (N-s/m^2) | 0.001 | | |
| Nominal gap, h (m) | 0.000015 | 15 | |
| Pressure thrust face dimensions (m, mm) | | | |
| Dp_1 | 0.020 | 20 | |
| Dp_2 | 0.021 | 21 | |
| Dp_3 | 0.027 | 27 | |
| Dp_4 | 0.029 | 29 | |
| Resistance/hp^3 from Dp_2 to Dp_3 | | | |
| Rp | 4.80E-04 | | |
| Effective areas (m^2) | | | |
| Dp_4 to Dp_3: Dp_43 | 8.80E-05 | | |
| Dp_3 to Dp_2: Dp_32 | 1.23E-04 | | |
| Dp_3 to Dp_1: Dp_31 | 3.46E-04 | | |
| Primary thrust face dimensions (m, mm) | | | |
| Dt_1 | 0.020 | 20 | |
| Dt_2 | 0.042 | 42 | |
| Dt_3 | 0.054 | 54 | |
| Resistance/ht^3 from Dt_2 to Dt_3 | | | |
| Rt | 4.80E-04 | | |
| Effective areas (m^2) | | | |
| Dt_3 to Dt_2: DT_32 | 4.15E-04 | | |
| Dt_2 to Dt_1: Dt_21 | 1.07E-03 | | |

| Displacement (%) | Pp (N/m^2) | Thrust (N) | Thrust/area*Ps |
|---|---|---|---|
| -50% | 181,125 | -839 | -8% |
| -40% | 370,082 | -600 | -6% |
| -30% | 684,852 | -203 | -2% |
| -20% | 1,159,200 | 395 | 4% |
| -10% | 1,794,720 | 1,198 | 12% |
| 0% | 2,535,750 | 2,133 | 21% |
| 10% | 3,276,780 | 3,068 | 31% |
| 20% | 3,912,300 | 3,870 | 39% |
| 30% | 4,386,648 | 4,469 | 45% |
| 40% | 4,701,418 | 4,866 | 49% |
| 50% | 4,890,375 | 5,105 | 51% |

LOW PROFILE SELF-COMPENSATED HYDROSTATIC THRUST BEARING

The present invention relates to thrust bearings that support a load by a thin film of pressurized fluid-liquid or gaseous but preferably water or the like, being more particularly though not exclusively directed to hydrostatic bearings useful for rotary spindles and the like suitable for very high speed rotation with a minimum of heat generation, and maximum load capacity; and exemplifying the concept of self compensation to make the design insensitive to contaminants and thereby allow for the use of such water based hydrostatic fluids.

Accordingly, the present invention allows designers to design a spindle having a shaft provided with a hydrostatic bearing end surface for resisting axial thrust force, upon the end surface, the hydrostatic bearing being a self-compensating bearing mounted circumferentially about the shaft near the end surface and having a fluid pressure supply groove providing fluid for the self-compensating bearing, the bearing being mounted upon an axially extending member one end of which serves as part of the end surface of the shaft and the other end of which serves as a reverse thrust surface, along with means for flowing fluid from the pressure supply groove radially across said reverse thrust end surface and through an opening extending axially between the reverse thrust end surface, and the end surface of the shaft, opposing the thrust force with pressure proportional to the axial position of the shaft and related to the degree of fluid compensation in the bearing.

BACKGROUND

Hydrostatic bearings have been in use for a very long time, and recent improvements in compensator design, such as discussed in U.S. Pat. Nos. 5,164,237, 5,281,032, and U.S. patent application (pending) Ser. No. 209,384 (High Speed Hydrostatic Spindle Design) provided means to allow water (or similar water-derived or related fluids herein generically referred to as 'water') to be used as a working fluid for the bearings. However, although water is an ideal fluid from a heat transfer perspective, and for reducing the shear forces on the spindle, its lower viscosity makes it more likely to cause greater leakage flows out of the compensator region, and hence means are needed to increase the bearing efficiency in areas where sufficient leakage lands cannot be provided, as is the case in a typical thrust bearing design.

The present invention allows designers to design an efficient self compensated thrust bearing for a spindle which typically requires greater load capacity in one direction than the other, as in drilling, milling, or grinding. Thrust forces usually dominate into a spindle, as opposed to pulling a spindle, in order to prevent pulling the tool out of its holder. The invention is realized by using the regulation of the radial flow between a pressure supply groove and a collector groove on one compensation thrust face by the bearing gap between that face and the spindle housing to compensate the flow from the collector groove axially to the thrust face that resists the major load. When the load is reversed, the compensation thrust face, even with its limited area, can support a respectable load. Meanwhile, the end face can be the entire diameter of the spindle shaft, and thus can support a huge axial thrust load.

OBJECT OF THE INVENTION

Accordingly, it is an object of the present invention to provide new and improved thrust bearing design that minimizes leakage flows and minimizes the amount which the shaft radius needs to be decreased to accommodate the thrust bearing, for fluid handling regions of hydrostatic thrust bearings that are used primarily for supporting high speed or high accuracy or highly axially loaded rotating spindles and the like. Other and further objects are hereafter explained and more particularly delineated in the appended claims.

SUMMARY

In summary, the invention embraces a spindle having a shaft provided with a hydrostatic beating end surface for resisting axial thrust force upon the end surface, the hydrostatic bearing being a self-compensating beating mounted circumferentially about the shaft near the end surface and having a fluid pressure supply groove providing fluid for the self-compensating bearing, the bearing being mounted upon an axially extending member one end of which serves as part of the end surface of the shaft and the other end of which serves as a reverse thrust surface, along with means for flowing fluid from the pressure supply groove radially across said reverse thrust end surface and through an opening extending axially between the reverse thrust end surface and the end surface of the shaft, opposing the thrust force with pressure proportional to the axial position of the shaft and related to the degree of fluid compensation in the bearing.

Preferred and best mode designs are hereinafter described.

DRAWINGS

The invention will now be described with reference to the accompanying drawing in which:

FIG. 1 is a cross section view through the thrust end of a spindle where the rotor is radially supported by a self compensated hydrostatic beating made from a sleeve with the geometry features cut in the ID and OD of the sleeve and then the sleeve is pressed into a bore of a housing, and the thrust bearing compensation rotor, which is fixed to the shaft by threaded or other known means, that contains the novel compensation means used to minimize leakage flow;

FIG. 7 is the output from a spreadsheet used to design the thrust bearing, which illustrates the derailed nature of the calculations required to achieve an effective efficient design.

THE INVENTION

Figure 1:
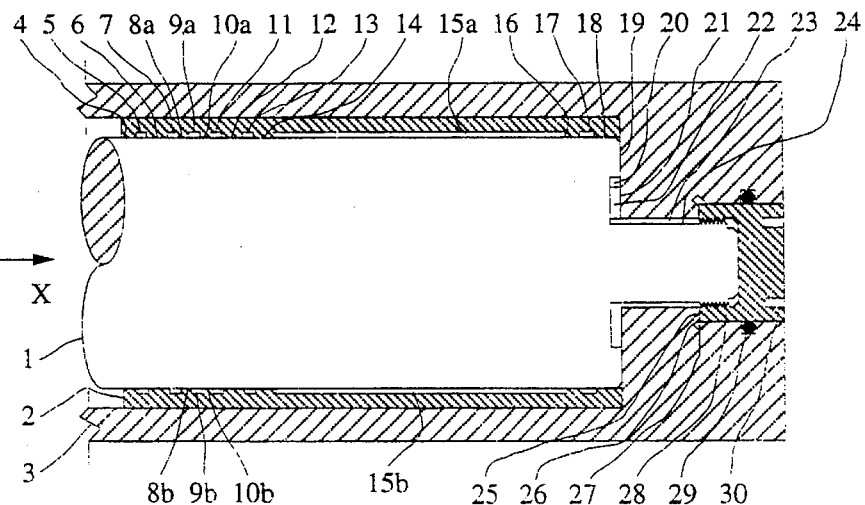

In general, a precision hydrostatic bearing supported spindle is manufactured from a housing, which bolts to the machine, a set of sleeves that contain the hydrostatic fluid flow control logic that are pressed into the housing, and a rotating shaft that fits inside the sleeves with a small clearance, typically from 5–50 microns depending on the size of the unit and the pressure and viscosity of the fluid and the speed of the spindle. A hydraulic pump supplies fluid to the bearings, and a motor turns the spindle rotor. Axial motion of the shaft is resisted by a thrust bearing. In general, the desire is to minimize the shaft diameter in order to minimize shear power which is a function of the diameter squared. The problem occurs when one tries to design in a self compensating bearing in the form discussed in U.S. Pat. Nos. 5,164,237, 5,281,032, and U.S. patent application (pending) Ser. No. 209,384 (High Speed Hydrostatic Spindle Design). These patents contain key advancements in hydrostatic bearing technology, such as modular design, slit compensators, and tangential feed methods. However, in some applications, the compensator requires a certain amount of space in order to work efficiently. In the case of a thrust bearing, for example, either the shaft must become of very small diameter, which weakens it considerably, or the thrust rotor must be large, which increases the shear power. The solution described herein recognizes that the pocket region that resists the load can be fed by fluid restricted as it flows from a pressure source across a gap-limited region and into a passage directly connected to the pocket. The load supported is a function of the trapezoidal pressure profile acting on the area between the pressure source and the restriction zone on one side, and the trapezoidal pressure profile acting on the area on the opposing side that is fed by restricted fluid from the pressure source side. The pressure source side requires a smaller area to generate load, and hence it would intrude far less into the beating shaft, or be contained, as shown in FIG. 1, at the end of the shaft, and at a smaller diameter. The primary thrust face side requires greater area to generate thrust, and thus it could be on the end of the spindle.

In this design, advantage is taken of the fact that if two springs are attached to either side of a block, and their other ends to ground, then the stiffness of the suspension of the block will be equal to sum of the stiffnesses of each of the springs.

In order to take advantage of this effect, it must be carefully mathematically modeled and optimized, as discussed below. First, however, to better describe the effect, the components are discussed in the context of the attached drawing.

In FIG. 1, a spindle rotor shaft 1 is supported by radial bearing sleeves at each end, only one of which, 2, is shown, that are pressed into a housing 3. In the sleeve, there are drain grooves 5, 13, and 17 which would be connected to external drains. Drain leakage lands 4, 6, 12, 16, and 18 have the same clearance between the shaft 1 and the inside diameter of the sleeve 2 as all other bearing surfaces, and thus act as seals by merit of the small gap. Any fluid that does make it across these lands would be sucked away by the drain grooves which may typically be connected to a suction pump. High pressure fluid from a pump is connected by common connection means to pressure supply grooves 7 and 11 for radial compensation, and 27 for thrust compensation. High pressure fluid flows across compensation lands 8a and 10a to collector grooves 9a and 9b. As described in U.S. Pat. No. 5,281,032, external helical groove means on the outside of the sleeve 2 would connect these collectors to opposing pockets 15b and 15a respectively. One other set in a plane perpendicular to the page would provide transverse stiffness.

The thrust bearing compensates only one bearing surface directly, which provides high stiffness in one direction, the direction of maximum thrust loading in a spindle for drilling or milling, and modest load capacity in the reverse direction. Taking advantage of the primarily unidirectional loading in a spindle minimizes the size of the bearing requirements, and greatly aids in miniaturization, which is required in such uses as cluster spindles, or for high speed spindles.

Figure 3:
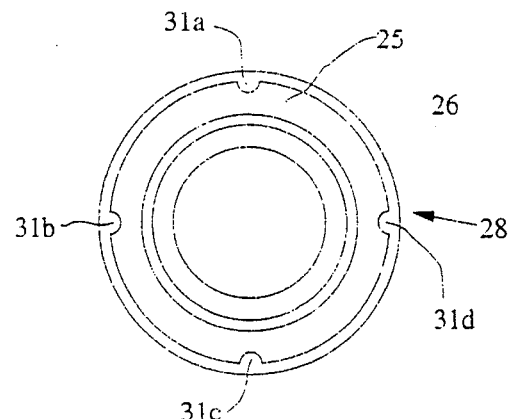
FIG. 3 is a cutaway view of the system showing the compensation thrust face.
Figure 6:
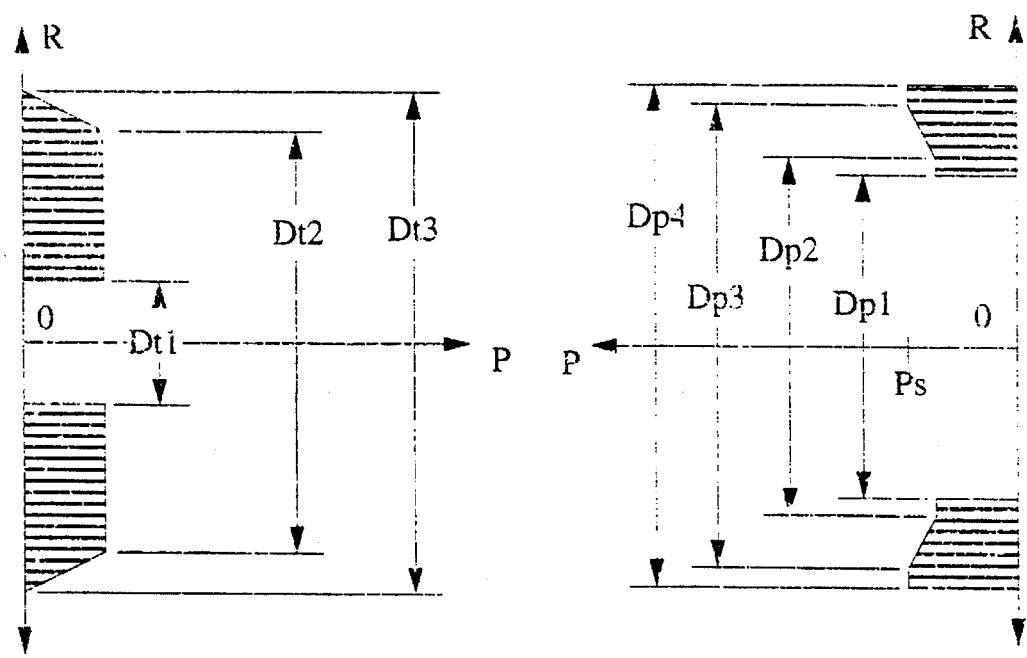
FIG. 6 is a plot of the pressure profiles on the thrust faces and the compensation thrust face.

To obtain this unique form of compensation, the spindle rotor diameter Dt3 necks down to a minor diameter of Dt1, which are defined in FIG. 6. The shaft extends backwards from this point to a point where it is threaded (or tapered if preferred). Onto the threads is attached an end cap 28. High pressure fluid from a pump is connected by any of several well known means to the thrust pressure supply annulus 27. A small portion of the outer region of the thrust cap, region 27 between diameters Dp4 and Dp3 defined in FIG. 6, ensures that the rotor will not become radially sealed before initial pressurization. Thin radial grooves 31a, 31b, 31c, and 31d, shown in FIG. 3, enhance this initial breakaway feature. There is a small axial gap between the end surface 19 of the spindle 1 and the housing 3, as well as a small axial gap between the thrust cap surface 25 and the housing 3, said gaps typically preferably being on the order of 10 micrometers. When a load is applied to the shaft 1 in the positive X direction, the gap between the surface 19 and the housing 3 closes up and the pressure rises on the thrust face of the shaft. This acts to counter the load. The pressure rises because as the gap on the surface 19 closes, the gap on the surface 25 opens, and more high pressure fluid from the supply groove 27 flows radially inward and then axially along large radial clearance 24, typically on the order of 0.5 mm, to act on the thrust face. There is no correlating compensator on the thrust face 19 to supply fluid to the thrust rotor cap which greatly simplifies the design, but does only provide limited load capacity in the negative X direction.

Figure 2:
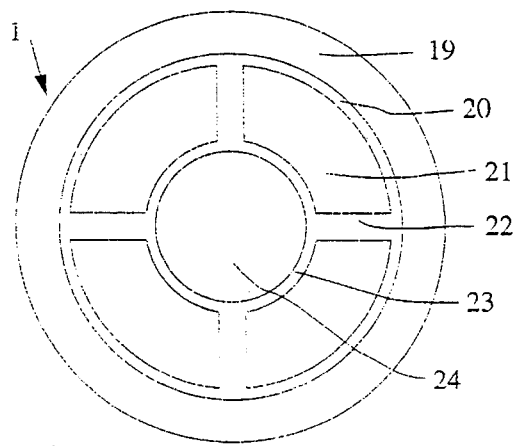
FIG. 2 is an end cutaway view of the spindle shaft showing the thrust bearing from the end of the spindle, which is the surface that, when subject to proper pressure, can support a great amount of load.

Once the pressure from the thrust rotor cap comes to the thrust face, as shown in FIG. 2, it is circumferentially distributed in annulus 23. It is then radially distributed in grooves 22 to a circumferential annulus 20. Land regions 21 are at the same elevation as the land 19, and these large regions act to function as huge squeeze film damping regions that give the system very large dynamic stiffness and impact resistance. The net result is the trapezoidal pressure profile shown in FIG. 6.

There is also a trapezoidal pressure profile on the thrust rotor cap face 25, which has a much higher pressure associated with it, but the area is much smaller. The result is that, although conceptually the design is very straightforward, mathematically it requires great care to balance the resistances and obtain a functional bearing. This procedure is described below.

Figure 4:
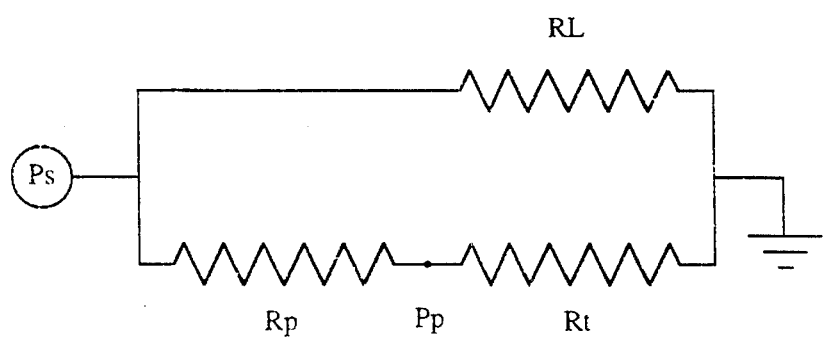
FIG. 4 is a schematic resistance diagram that shows the simplicity, and hence novelty that it can be realized mechanically, and the efficiency of the design.
Figure 5:
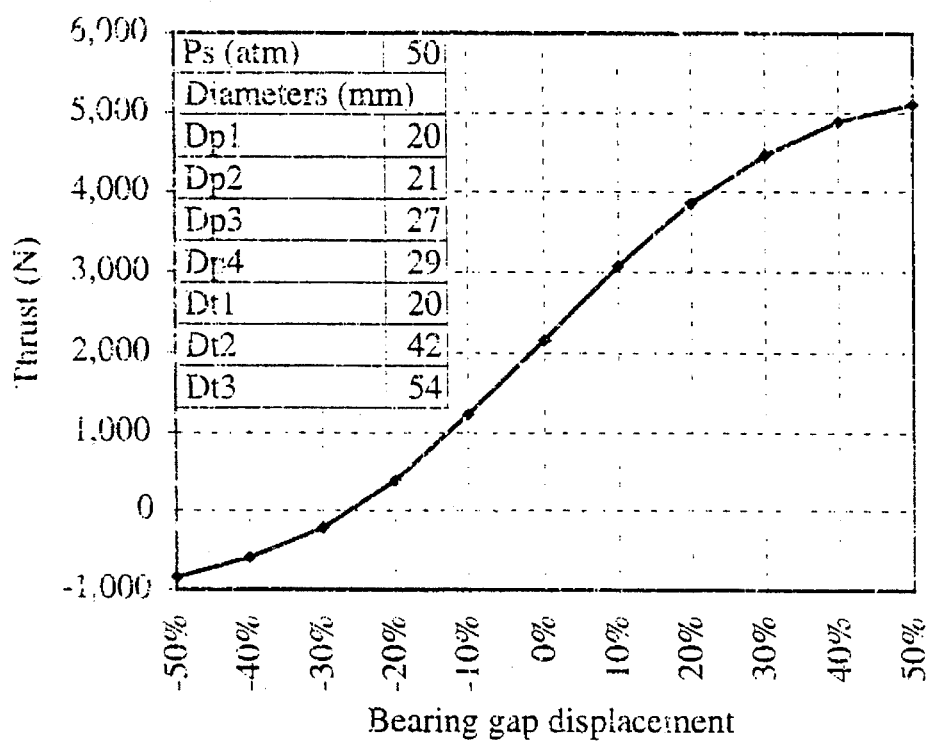
FIG. 5 is a plot of the thrust loads a typical bearing can support as determined from the formula presented below.

The analysis of a rotary thrust bearing system assumes the circuit described in FIG. 4. The pocket pressure in the thrust face is given by:

$$P_p = \frac{R_t}{R_p + R_t}.$$

The resistance $R_p$ between the pressure source groove 27 and the collector groove/axial clearance region 24 is a function of the diameters $D_{p3}$ and $D_{p2}$ and the nominal axial gap $h_{axial}$ and displacement $\delta_{axial}$:

$$R_p = \frac{6 \mu \ln\left(\frac{D_{p3}}{D_{p2}}\right)}{\pi(h_{axial} + \delta_{axial})^3}.$$

The resistance $R_t$ across the thrust face land 19 is a function of the diameters $D_{f2}$ and $D_{f3}$ and the nominal axial gap $h_{axial}$ and displacement $\delta_{axial}$:

$$R_t = \frac{6 \mu \ln\left(\frac{D_{f3}}{D_{f2}}\right)}{\pi(h_{axial} - \delta_{axial})^3}.$$

Now that the fluid resistances have been calculated, and the pocket pressure determined, the product of the pocket pressure with the effective areas, which are the integral of the pressure acting over the areas as the pressure changes as a function of position within the area, can be determined. These pressures and areas are illustrated in FIG. 6. For the thrust rotor cap 28, the pressure starts at the supply pressure acting over the annulus from $D_{p4}$ to $D_{p3}$:

$$F_{p43} = P_s \frac{\pi(D_{p4}^2 - D_{p3}^2)}{4},$$

$$F_{p32} = \frac{\pi(P_S - P_p)}{4} \left[ D_{p3}^2 - 2D_{p2}^2 + \frac{D_{p3}^2 - D_{p2}^2}{2 \ln\left(\frac{D_{p3}}{D_{p2}}\right)} \right], \text{ and}$$

$$F_{p31} = P_p \frac{\pi(D_{p3}^2 - D_{p1}^2)}{4},$$

For the thrust face, there is a central annulus at the pocket pressure, and then two regions where the pressure drops off to atmospheric pressure. The force contributions from these areas are:

$$F_{f12} = P_p \frac{\pi(D_{f2}^2 - D_{f1}^2)}{4}, \text{ and}$$

$$F_{f21} = \frac{\pi P_p}{4} \left[ D_{f2}^2 - 2D_{f1}^2 + \frac{D_{f2}^2 - D_{f1}^2}{2 \ln\left(\frac{D_{f2}}{D_{f1}}\right)} \right]$$

These formulas are readily incorporated into a spreadsheet which allows the designer to play "what-if" games to optimize the bearing design. A portion of a typical spreadsheet that incorporates these formulas is shown in FIG. 7.

Figure 8:
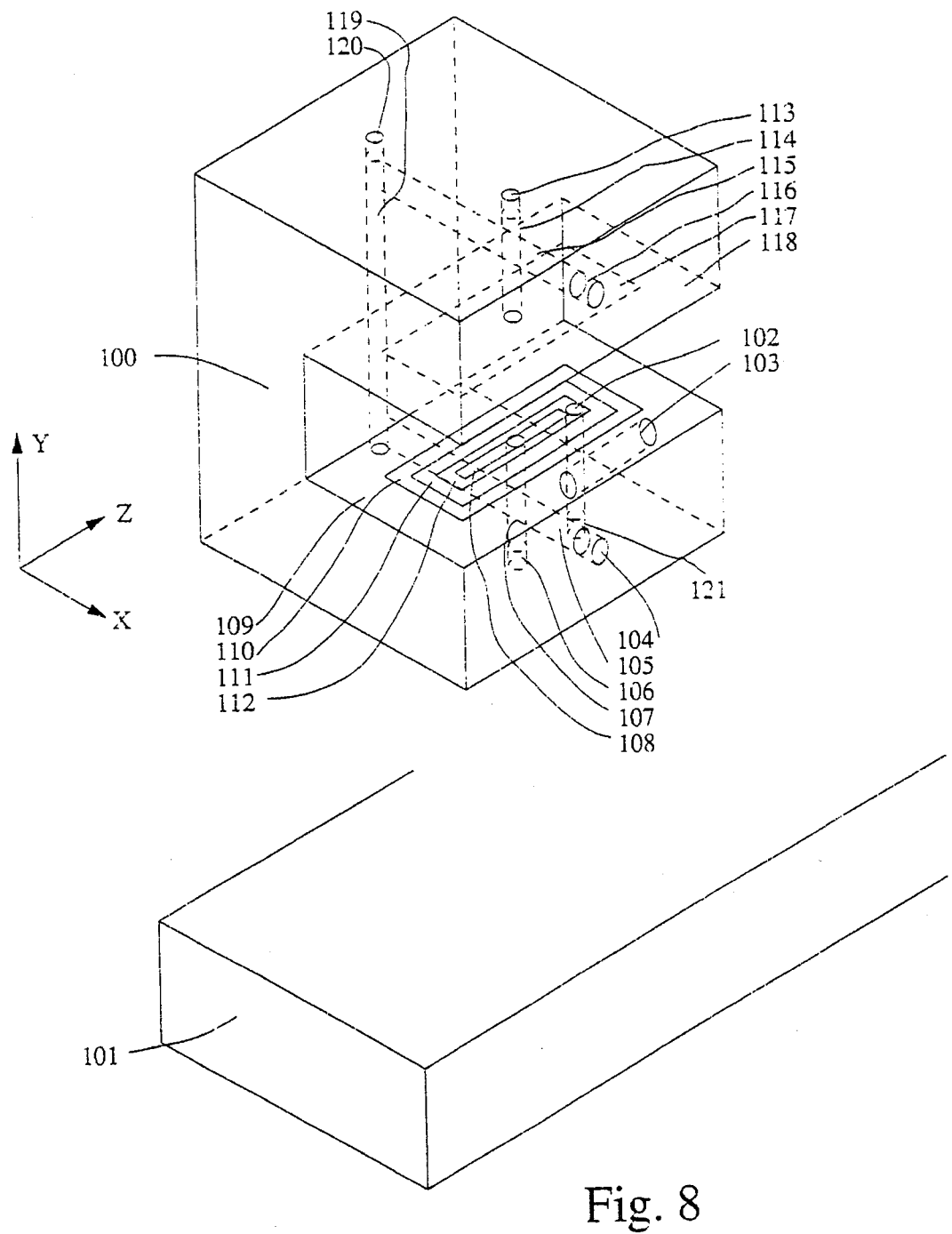
FIG. 8 is a view similar to FIG. 1 illustrating the invention as applied to a linear rail or member.

While the invention has heretofore been described with reference to spindles and rotary bearing applications, the technique of the invention is also useful in linear and other curvilinear systems including, for example, a linear carriage rail or the like. In FIG. 8, therefore, there is shown a linear rail 101 with a rectangular (but not limited to) cross section. A modular bearing block 100 straddles the rail such that there is a small hydrostatic bearing gap, typically 10–20 microns, between the surfaces 118 and 110 and the rail 101. Pressure is supplied to the bearing through hole 103 that is connected to hole 102 by cross drilling and plugging with plug 121. Fluid enters the shallow groove region 111 and some flows out across land region 110 to a recessed area 109 and atmospheric pressure. Fluid also flows across compensation lands 112 and into groove 108 and then into hole 107, which has been cross-drilled from the bottom and one end plugged by 106. This hole is intersected by horizontal hole 105 that is plugged with plug 104. The fluid then flows to hole 119 that is plugged with plug 120 and then into hole 115 plugged at one end with plug 115, and then down hole 114, which is plugged with plug 113, and into the pocket 117. From the pocket 117, the fluid then flows across the land 118 and to the atmosphere.

When a force is applied to the bearing 100 in a negative Y direction, the gap between the land 112 and the rail 101 opens up and more fluid from the pressure supply flows into the collection groove 108 and then is direction to the opposed pocket 117 which then sees a pressure rise and the applied lead is balanced. For a force in the positive Y direction, the lands 112 close the gap between the rail 101, and less fluid flows to the pocket 117.

Using the above type equations, the designer must optimize the system by balancing the stiffness which is a function of the relative areas of the land and pocket regions 118 and 117 on one side and the lands 110, 112 and grooves 111 and 108 on the other side, and the relative pressures that are obtained as a function of the bearing displacement and the subsequent changes in heights between the lands and rail.

Further modifications of the invention will also occur to persons skilled in the art, and all such are deemed to fall within the spirit and scope of the invention as defined by the appended claims.

What is claimed is:

1. A spindle having a shaft mounted within a hydrostatic bearing having an end surface for resisting axial thrust force upon the end surface, the hydrostatic bearing being a fluid-controlled self-compensating bearing mounted circumferentially about the shaft near the end surface, the bearing being mounted upon an axially extending member one end of which serves as part of the end surface of fie shaft and the other end of which serves as a reverse thrust surface, a fluid supply groove extending radially across said reverse thrust end surface an opening extending axially between the reverse thrust end surface and the end surface of the shaft, and connecting with the groove, a source of pressurized fluid, and means for connecting the source with the groove to flow fluid therealong and through the opening, thereby opposing the thrust force with pressure proportional to the axial position of the shaft and related to the degree of fluid compensation in the bearing.

2. A spindle as claimed in claim 1 and in which there is provided means for applying the axial thrust for such purposes as shaft control of drilling, milling, and grinding operations.

3. A spindle as claimed in claim 1 and in which said end thrust surface on the shaft has an inner circumferential groove for receiving the compensated pressure flow from the said thrust end, and an outer circumferential groove at a larger radius, and radial groove means to connect the two circumferential grooves to allow the entire region between the grooves to serve as a constant pocket pressure region, while forming damping land regions between the inner and outer circumferential grooves, that serve as squeeze film dampers to increase the dynamic stiffness of the beating.

4. A spindle as claimed in claim 1 and in which the diameter of the combination of the bearing and its axially extending member exceeds the diameter of the shaft.

5. A spindle as claimed in claim 1 and in which the reverse thrust surface has radial grooves that partially extend into said compensation land region between said pressure supply annulus and said collector annulus, said radial grooves helping the pressure to initially penetrate said compensation land region during initial startup, without significantly adversely affecting the compensation mathematics and efficiency of the system.

6. A spindle as claimed in claim 1 and in which the spindle shaft has a smaller diameter section extending axially through a housing to hold the combined pressure compensation reverse thrust surface, and in which the means for flowing fluid from the pressure supply groove causes the fluid to flow radially across a compensation land on said reverse thrust surface to a collector annulus and through an opening extending axially between the reverse thrust surface and the end thrust surface of the shaft.

7. A hydrostatic self compensating bearing for mounting along a longitudinally extending member and having on one side a fluid pressure supply groove for providing fluid for the self compensating bearing, and a pocket located opposite the pressure supply groove on the other side of the bearing, the bearing being mounted upon the longitudinally extending member with one surface of the member serving as a thrust resisting surface, and an opposed surface serving as a reverse thrust surface, the pressure supply groove extending across said reverse surface, an opening extending longitudinally between the reverse thrust surface and the said thrust resisting surface of the member and connecting with the groove and with said pocket, a source of pressurized fluid, and means for connecting the source with the groove to flow fluid therealong and through the opening and into said pocket thereby, opposing the thrust force with pressure proportional to the position of the member and related to the degree of fluid compensation in the bearing.

8. A hydrostatic bearing as claimed in claim 7, and in which the longitudinally extending member is a rotating shaft, and the bearing is mounted circumferentially about the shaft near an end surface that receives axial thrust forces.

9. A bearing as claimed in claim 7, and in which the longitudinally extending member is a carriage rail, and the bearing is mounted with the pressure supply groove located above one surface of said member, and the said pocket above the opposite surface of said member.

* * * * *